(12) United States Patent
Hinckley et al.

(10) Patent No.: US 10,162,511 B2
(45) Date of Patent: Dec. 25, 2018

(54) SELF-REVELATION AIDS FOR INTERFACES

(75) Inventors: Kenneth P. Hinckley, Redmond, WA (US); Shengdong Zhao, Scarborough (CA); Edward B. Cutrell, Seattle, WA (US); Raman K. Sarin, Redmond, WA (US); Patrick M. Baudisch, Seattle, WA (US); Darryl Yust, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 877 days.

(21) Appl. No.: 13/486,180

(22) Filed: Jun. 1, 2012

(65) Prior Publication Data

US 2012/0240043 A1 Sep. 20, 2012

Related U.S. Application Data

(62) Division of application No. 12/017,114, filed on Jan. 21, 2008, now Pat. No. 8,196,042.

(51) Int. Cl.
| | | |
|---|---|---|
| *G06F 17/00* | (2006.01) | |
| *G06F 3/048* | (2013.01) | |
| *G06F 3/00* | (2006.01) | |
| *G06F 3/0488* | (2013.01) | |
| *G06F 9/451* | (2018.01) | |

(52) U.S. Cl.
CPC .......... *G06F 3/04883* (2013.01); *G06F 9/453* (2018.02)

(58) Field of Classification Search
CPC ........ B62D 7/18; G06F 9/4446; G06F 3/0481
USPC ......................................... 715/705, 711, 200
See application file for complete search history.

(56) References Cited

U.S. PATENT DOCUMENTS

| | | |
|---|---|---|
| 5,008,810 A | 4/1991 | Kessel et al. |
| 5,121,475 A | 6/1992 | Child et al. |
| 5,287,448 A | 2/1994 | Nicol et al. |
| 5,425,102 A | 6/1995 | Moy |
| 5,546,521 A | 8/1996 | Martinez |
| 5,557,731 A | 9/1996 | Li et al. |

(Continued)

FOREIGN PATENT DOCUMENTS

| | | |
|---|---|---|
| EP | 0816991 | 1/1998 |
| GB | 2341952 | 3/2000 |
| WO | WO2006013372 | 2/2006 |

OTHER PUBLICATIONS

Hinckley, et al., "Design and Analysis of Delimiters for Selection-Action Pen Gesture Phrases in Scriboli" <<http://delivery.acm.org/10.1145/1060000/1055035/p451-hinckley.pdf?key1=1055035&key2=2558685811&coll=GUIDE&dl=GUIDE&CFID=30244476&CFTOKEN=60820277>> Apr. 2-7, 2005, 10 pages, Portland, Oregeon, USA.

(Continued)

*Primary Examiner* — Manglesh M Patel
(74) *Attorney, Agent, or Firm* — Schwegman Lundberg & Woessner, P.A.

(57) ABSTRACT

Systems and/or methods are provided that facilitates revealing assistance information associated with a user interface. An interface can obtain input information related to interactions between the interface and a user. In addition, the interface can output assistance information in situ with the user interface. Further, a decision component that determines the in situ assistance information output by the interface based at least in part on the obtained input information.

19 Claims, 12 Drawing Sheets

(56) References Cited

U.S. PATENT DOCUMENTS

| | | | |
|---|---|---|---|
| 5,686,937 A * | 11/1997 | Li | G06F 3/04855 345/684 |
| 5,736,984 A | 4/1998 | Jellinek et al. | |
| 5,740,035 A | 4/1998 | Cohen et al. | |
| 5,754,176 A | 5/1998 | Crawford | |
| 5,793,952 A | 8/1998 | Limsico | |
| 5,883,626 A * | 3/1999 | Glaser et al. | 715/788 |
| 5,895,455 A | 4/1999 | Bellinger et al. | |
| 5,956,709 A | 9/1999 | Xue | |
| 5,986,568 A | 11/1999 | Suzuki et al. | |
| 5,991,882 A | 11/1999 | O'Connell | |
| 5,995,101 A | 11/1999 | Clark et al. | |
| 6,020,886 A * | 2/2000 | Jacober | G06F 9/4446 434/118 |
| 6,073,119 A | 6/2000 | Bornemisza-Wahr et al. | |
| 6,100,855 A | 8/2000 | Vinson et al. | |
| 6,232,957 B1 * | 5/2001 | Hinckley | 345/156 |
| 6,246,411 B1 * | 6/2001 | Strauss | 715/863 |
| 6,317,128 B1 * | 11/2001 | Harrison et al. | 345/629 |
| 6,333,753 B1 * | 12/2001 | Hinckley | 715/768 |
| 6,337,702 B1 | 1/2002 | Bates et al. | |
| 6,347,290 B1 | 2/2002 | Bartlett | |
| 6,493,006 B1 | 12/2002 | Gourdol et al. | |
| 6,542,164 B2 * | 4/2003 | Graham | 715/711 |
| 6,609,106 B1 | 8/2003 | Robertson | |
| 6,662,340 B2 | 12/2003 | Rawat et al. | |
| 6,763,496 B1 | 7/2004 | Hennings et al. | |
| 6,828,988 B2 * | 12/2004 | Hudson et al. | 715/711 |
| 7,047,501 B2 * | 5/2006 | Morcos et al. | 715/779 |
| 7,180,501 B2 | 2/2007 | Marvit et al. | |
| 7,343,551 B1 | 3/2008 | Bourdev | |
| 7,464,343 B2 * | 12/2008 | Shaw et al. | 715/850 |
| 7,478,107 B1 | 1/2009 | Yehuda | |
| 7,553,340 B2 * | 6/2009 | Tzikas et al. | 8/641 |
| 7,647,555 B1 | 1/2010 | Wilcox et al. | |
| 7,685,519 B1 * | 3/2010 | Duncan et al. | 715/711 |
| 7,782,319 B2 | 8/2010 | Ghosh et al. | |
| 7,840,912 B2 * | 11/2010 | Elias et al. | 715/863 |
| 8,893,054 B2 * | 11/2014 | Amento et al. | 715/863 |
| 8,959,476 B2 * | 2/2015 | Ramani | G06F 8/38 717/100 |
| 2001/0002128 A1 | 5/2001 | Takayama et al. | |
| 2002/0083449 A1 | 6/2002 | Im | |
| 2002/0091993 A1 | 7/2002 | Walley et al. | |
| 2002/0175955 A1 | 11/2002 | Gourdol et al. | |
| 2003/0058266 A1 | 3/2003 | Dunlap et al. | |
| 2003/0058267 A1 | 3/2003 | Warren | |
| 2003/0059009 A1 | 3/2003 | Meyerson et al. | |
| 2003/0063126 A1 * | 4/2003 | Yanchar et al. | 345/781 |
| 2003/0084115 A1 | 5/2003 | Wood et al. | |
| 2003/0229608 A1 | 12/2003 | Reynar et al. | |
| 2004/0006480 A1 | 1/2004 | Ehlen et al. | |
| 2004/0036714 A1 * | 2/2004 | Blakely | G06F 3/0481 715/711 |
| 2004/0153973 A1 * | 8/2004 | Horwitz | 715/530 |
| 2004/0268225 A1 | 12/2004 | Walsh et al. | |
| 2005/0022130 A1 | 1/2005 | Fabritius | |
| 2005/0081152 A1 | 4/2005 | Commarford et al. | |
| 2005/0149395 A1 | 7/2005 | Henkin et al. | |
| 2005/0198563 A1 | 9/2005 | Kristjansson | |
| 2005/0234759 A1 | 10/2005 | Coleman et al. | |
| 2006/0026534 A1 | 2/2006 | Ruthfield et al. | |
| 2006/0026536 A1 | 2/2006 | Hotelling et al. | |
| 2006/0075344 A1 | 4/2006 | Jung et al. | |
| 2006/0085750 A1 | 4/2006 | Easton, Jr. et al. | |
| 2006/0085767 A1 | 4/2006 | Hinckley et al. | |
| 2006/0101354 A1 | 5/2006 | Hashimoto et al. | |
| 2006/0129835 A1 | 6/2006 | Ellmore | |
| 2006/0214926 A1 | 9/2006 | Kolmykov-Zotov et al. | |
| 2006/0267966 A1 | 11/2006 | Grossman et al. | |
| 2007/0027733 A1 | 2/2007 | Bolle et al. | |
| 2007/0083827 A1 * | 4/2007 | Scott | G06F 9/4443 715/811 |
| 2007/0143324 A1 * | 6/2007 | Eichhorst | 707/101 |
| 2007/0162898 A1 * | 7/2007 | Ramani et al. | 717/135 |
| 2007/0168890 A1 | 7/2007 | Zhao et al. | |
| 2007/0174150 A1 * | 7/2007 | Wadhwa | G06Q 10/087 705/28 |
| 2007/0300161 A1 | 12/2007 | Bhatia et al. | |
| 2008/0034329 A1 | 2/2008 | Posner et al. | |
| 2009/0187824 A1 | 7/2009 | Hinckley et al. | |
| 2009/0319894 A1 * | 12/2009 | Markiewicz | G06F 3/04883 715/702 |
| 2013/0019174 A1 * | 1/2013 | Gil et al. | 715/711 |

OTHER PUBLICATIONS

Hinckley, et al., "InkSeine: In Situ Search for Active Note Taking" <<http://delivery.acm.org/10.1145/1250000/1240666/p251-hinckley.pdf.key1=1240666&key2=2259685811&coll=GUIDE&dl=GUIDE&CFID=30246043&CFTOKEN=51841122>> Apr. 28-May 3, 2007, 10 pages, San Jose, CA USA.

Kurtenbach et al., "Contextual Animation of Gestural Commands", Computer Graphic Forum, vol. 13, Dec. 1994, No. 5, pp. 303-314.

Leung, "Handling Ambiguous User Input on Touchscreen Kiosks", located at <<http://dspace.mit.edu/handle/1721.1/34461> Jun. 2005, 2 pages.

Millard, et al., "Construction of a Contextually-Aware Pervasive Computing Environment", School of Electronics and Computer Science, University of Southampton, Jun. 2005, AKT Workshop, 9 pages.

Moran, et al., "Pen-Based Interaction Techniques for Organizing Material on an Electronic Whiteboard", Proc 10th Annual ACM Symposium on User Interface Software and Technology, Oct. 1997, 10 pages.

Non-Final Office Action for U.S. Appl. No. 12/017,114, dated Apr. 26, 2012, Kenneth P. Hinckley et al., "Self-Revelation Aids for Marking Interfaces", 13 pages.

Final Office Action for U.S. Appl. No. 12/017,114, dated May 25, 2011, Kenneth P. Hinckley, "Self-Revelation Aids for Marking Interfaces", 16 pgs.

Non-Final Office Action for U.S. Appl. No. 12/017,114, dated Aug. 31, 2011, Kenneth P. Hinckley, "Self-Revelation Aids for Marking Interfaces", 16 pages.

Shen, "Interactive tabletops—User Interface, Metaphors and Gestures" <<http://www.interactiontomorrow.org/material/04-slides-chia%20(2%20pages).pdf>>, ACM SIGGRAPH Aug. 2007, 10 pages.

"User Assistance", Apple Human Interface Guidelines: User Assitance, Developer Connection, printed from website: http://developer.apple.com/documentation/userexperience/Conceptual/OSXHIGuidelines/ . . . , Jun. 21, 2006, 3 pages.

* cited by examiner

SELF-REVELATION AIDS FOR INTERFACES

CROSS REFERENCE TO RELATED APPLICATIONS

This patent application is a divisional of, and claims priority to, co-pending, commonly-owned U.S. patent application Ser. No. 12/017,114, filed on Jan. 21, 2008 and titled "SELF-REVELATION AIDS FOR INTERFACES", the disclosure of which is incorporated herein in its entirety.

BACKGROUND

Technological advances associated with computers, operating systems and applications have enabled users to interact with systems in a vast and diverse amount of ways. A user interface can provide textual, graphical and/or auditory information to the user. In addition, a user interface can receive and/or solicit input from the user that is utilized to control or operate a computer and software executing on the computer. Typically, input can be obtained via a keyboard, mouse, track pad, track ball, digital pen, and/or touch screen. Further, user interfaces can be non-interactive such as batch interfaces wherein all input is provided up front in batch jobs. In addition, interactive user interfaces can range from simple (e.g., command line interfaces) to complex (e.g., graphical user interfaces). As interfaces grow in complexity, the functionality and features provided therein also expands.

A user often must overcome a learning curve with a user interface before efficient, productive utilization of the interface can occur. Moreover, for novel interfaces (e.g., gesture-based, touch-based, crossing-based, etc.), it can be even more difficult to learn and understand the mechanisms employable to fully interact with the system. User interface documentation can be provided in the form of help screens or user manuals. However, such information is typically provided separate from the application and/or user interface such that it is difficult to perceive both simultaneously.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The subject innovation relates to systems and/or methods that facilitate providing assistance information in situ with a user interface. Assistance information or tips can overlay the user interface without disturbing a mode, state or responsiveness of the underlying user interface. Thus, a user can perceive the tips that convey assistance information related to features or functionality of the user interface without having to leave the context of the interface. Self-revelation is utilized to allow assistance information to appear and/or disappear automatically based on obtained input information or a context of the interface and/or user.

In accordance with an aspect of the disclosure, a tip revelation system is provided. The system includes a decision component that ascertains whether to show and/or dismiss tips or tip collections based upon obtained user input and/or context information. For example, the decision component can activate a tip related to a marking menu (i.e., menu with options positioned at different directions relative to a central control element) if the decision component senses that the user is hovering over the marking menu without initiating an option via a directional gesture with an input device.

According to another aspect of the disclosure, mechanisms are provided to enable a user to explicitly show or hide tips and/or tip collections. In addition, preference data can be persisted such that particular tips will not be revealed after a user becomes familiar with the associated features or functionality of the interface. Moreover, mechanisms are provided to extend gesture-based input to legacy applications developed without gestures in mind.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
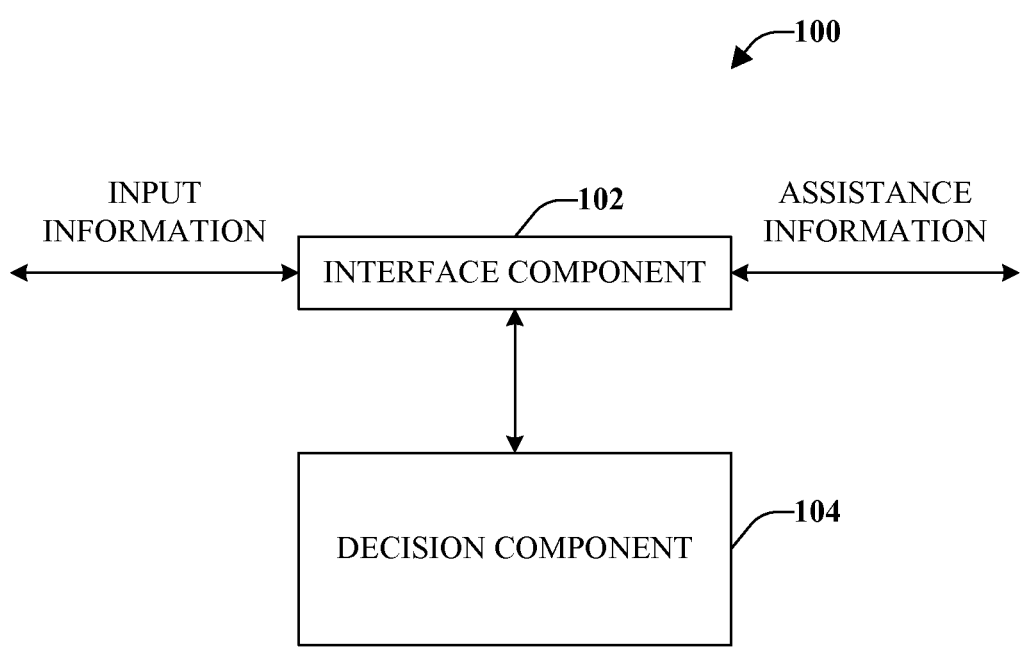
FIG. 1 illustrates a block diagram of an exemplary system that facilitates providing assistance information in situ with a user interface.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates self-revelation of help information or aides related to a user interface. The help information can be tips associated with aspects of the user interface to explain, demonstrate or otherwise inform a user of the functionality provided. The system 100 includes an interface component 102 that obtains input information and outputs assistance information based at least in part on the obtained input information. In one embodiment, the interface component 102 generates and displays a graphical user interface. The input information can be, for example, interactions of a user with the interface component 102 via an input device (not shown) such as, but not limited to, a tablet and pen, a touch screen, a mouse, a touch pad, a track ball, and/or any other suitable device capable of receiving and/or soliciting user interaction with respect to an interface. The assistance information can relate to functionality of the interface component 102 revealed in such a way to enable a user to easily discover and employ various functional features via the input device. For example, the assistance information can be a graphical overlay on the user interface that is displayed associated with at least a portion of the interface indicating techniques employable with the portion. In addition, the assistance information can be displayed in situ with the user interface. In an embodiment, the in situ assistance information is rendered in a manner distinct from the underlying user interface to highlight the assistance information as being separate from the user interface. Furthermore such assistance may be rendered in a manner that intuitively suggests to the user that the assistance information consists of illustrative annotations, rather than graphical controls ("widgets") that are meant to be tapped or otherwise operated directly.

Pursuant to an illustration, the interface component 102 can be a gesture-based interface such as, for example, a pen and tablet interface. It is to be appreciated and understood that gestures can be movements associated with commands. Moreover, gestures can be movements that require a user to provide a motion with an input device to activate the associated commands. By way of example, in a gesture-based interface, a user can initiate a scrolling action by motioning the input device in a circular or spiral pattern. In an embodiment, a gesture can be characterized by a variety of parameters such as, but not limited to, a gesture start point, an end point, a track line (e.g., the path of the gesture movement), a speed of motion and/or any other parameters capable of distinguishing one gesture from another gesture. It is to also be appreciated that gestures can be employed in conjunction with a plurality of interfaces and input devices. For example, a mouse-based interface can be employed wherein a user motions the mouse cursor in accordance with a gesture to initiate a command. Further, the interface component 102 includes mechanisms to integrate in situ assistance information into virtually any application wherein assistance information can enable a user to discover, learn and employ features of the application user interface.

The system 100 can also include a decision component 104 that determines the in situ assistance information output by the interface component 102. The decision component 104 analyzes the input information obtained by the interface component 102 to evaluate whether to display a tip and/or a collection of tips in situ with the user interface. In addition, the decision component 104 takes into account context information such as a state of underlying interface elements (e.g., user interface controls), screen dialogs currently in use, a current mode of the interface, a state of the user and/or any other information suitable for a determination of whether to reveal tips. For example, a user, utilizing an input device, can hover in proximity to a particular interface element. From the hovering, the decision component 104 can infer that the user is unsure how to activate a desired feature. Accordingly, the decision component 104 can determine that a tip associated with the particular interface elements should be displayed to the user in situ with the interface element. Moreover, the decision component 104 can ascertain whether currently displayed tips and/or tip collections should be dismissed or hidden based upon consideration of the input information and/or context information. The decision component 104 can establish if tips and/or tip collections require adjusting or rearranging is response to a user moving and/or resizing underlying user interface elements.

Figure 2:
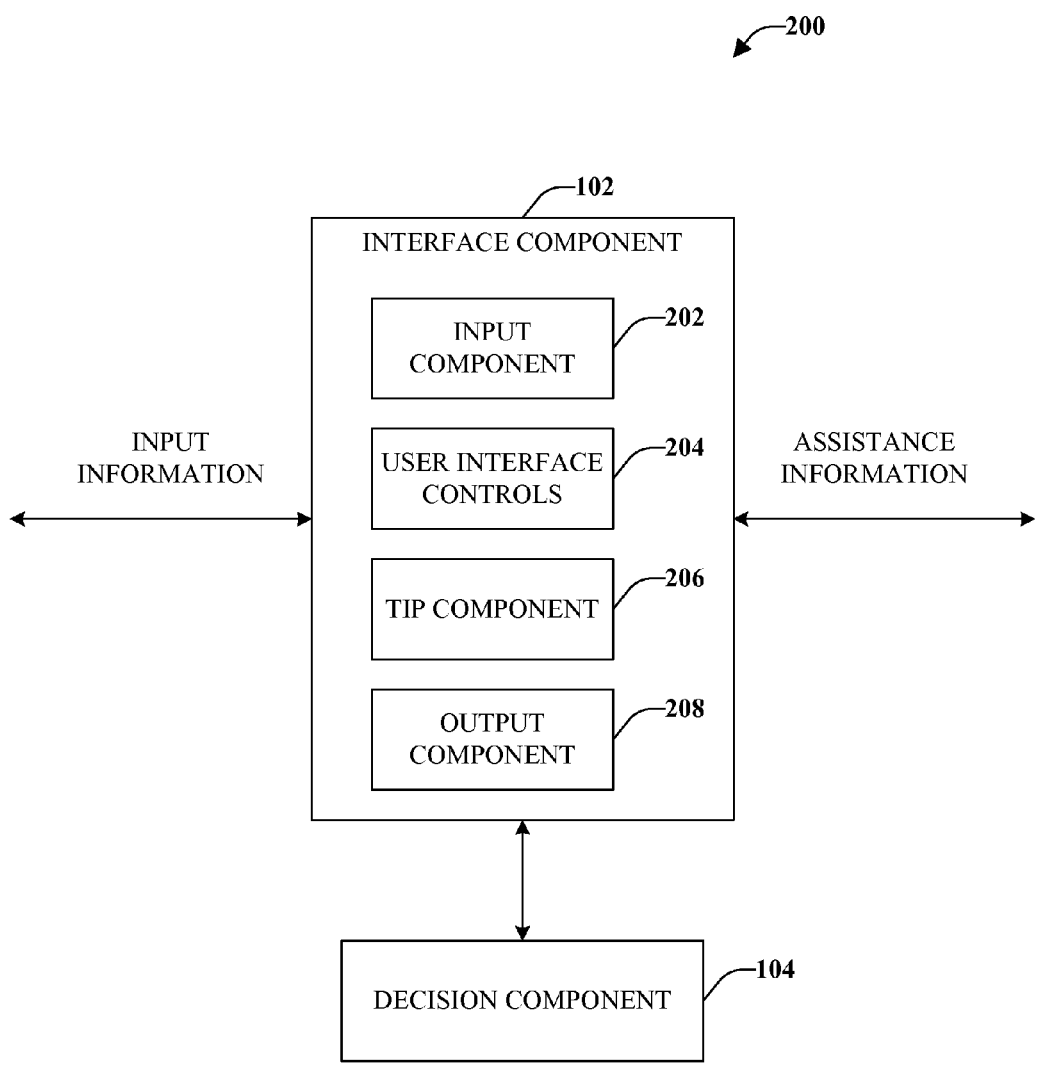
FIG. 2 illustrates a block diagram of an exemplary system that facilitates providing in situ assistance information with a detailed interface component in accordance with an aspect of the subject disclosure.

FIG. 2 illustrates a system 200 that facilitates providing in situ tips associated with a user interface. The system 200 can include the decision component 104 that determines whether tips and/or tip collections should be displayed in situ with a user interface provided by interface component 102. In addition, the decision component 104 can establish which tips, tip collections, and/or tips within a tip collection should be revealed based upon the input information, context information, and/or history information associated with a user. Furthermore decision component 104 may employ information about the constraints of the device's screen size such that some tips are elided, modified, or show in different relative locations to accommodate small screen devices. The decision component also takes into account events such as moving or resizing the underlying applications, or changing the screen orientation, to correctly display in situ tips.

The interface component 102 can include an input component 202 that collects input information from a user (not shown). In addition, the interface component 102 can include user interface (UI) controls 204. The input component 202 can employ one or more controls among UI controls 204 to gather, solicit and/or receive input information from a user. UI controls 204 are interface elements utilized by a user to interact with a computing environment. UI controls 204 can include graphical objects such as, but not limited to, a button, a check box, a text box, a text label, a slider, a list box, a spinner, a drop-down list, a menu, a toolbar, a toolbar icon, a ribbon, a combo box (i.e., a text box with attached menu or list box), an icon, a tree view, a grid view, a tab, a scrollbar, a status bar, a progress bar and/or any other element capable of facilitating user interaction. In addition, UI controls 204 can include interface elements that are collections of other interface elements. For example, UI controls 204 can include windows, dialog boxes, palette windows, drawers, heads-up displays and the like. UI controls 204 are employed to generate a graphical user interface (GUI) provided by the interface component 102.

The interface component can also include a tip component 206 that provides tips or assistance information associated with UI controls 204. Tip component 206 can include tips and/or tip collections associated with UI controls of the GUI. The tips and/or tip collections reveal assistance information that indicate, demonstrate and/or expose functionality of UI controls 204. The tips provided by tip component 206 can be overlaid on the underlying GUI. In an embodiment, the tips can be transparent or partially translucent to enable a user to see the underlying GUI. Further, the tips can be opaque. In addition, the tips of tip component 206 can present tips in accordance with a style distinct from UI controls 204 so that the tips can be easily distinguished from the underlying interface while also enabling the tips to be displayed in situ with the UI controls 204. For example, the tips can include different color schemes, different typefaces, etc. than employed in the GUI. In an embodiment, exemplar gestural strokes and descriptions of those gestures can be presented in an informal handwritten annotation style with yellow highlighting (similar to marked-up corrections or comments on a real physical document), such that users intuitively understand the tips to be informative annotations of the underlying interface.

The interface component 102 can also include an output component 208 that coordinates construction, generation and/or maintenance of the GUI. The output component 208 can render UI controls 204 to a display or other output device (not shown). In addition, the output component 208 can present tips and/or tip collections supplied from tip component 206 in situ with UI controls 204 rendered on the output device. The output component 208 reveals tips based at least in part upon determinations made by the decision component 104. For example, the decision component can ascertain to show only a tip overlay associated with a particular marking menu or gesture-based menu. Accordingly, output component 208 renders the appropriate tip overlay from tip component 206 in conjunction with the marking menu control of UI controls 204.

Figure 3:
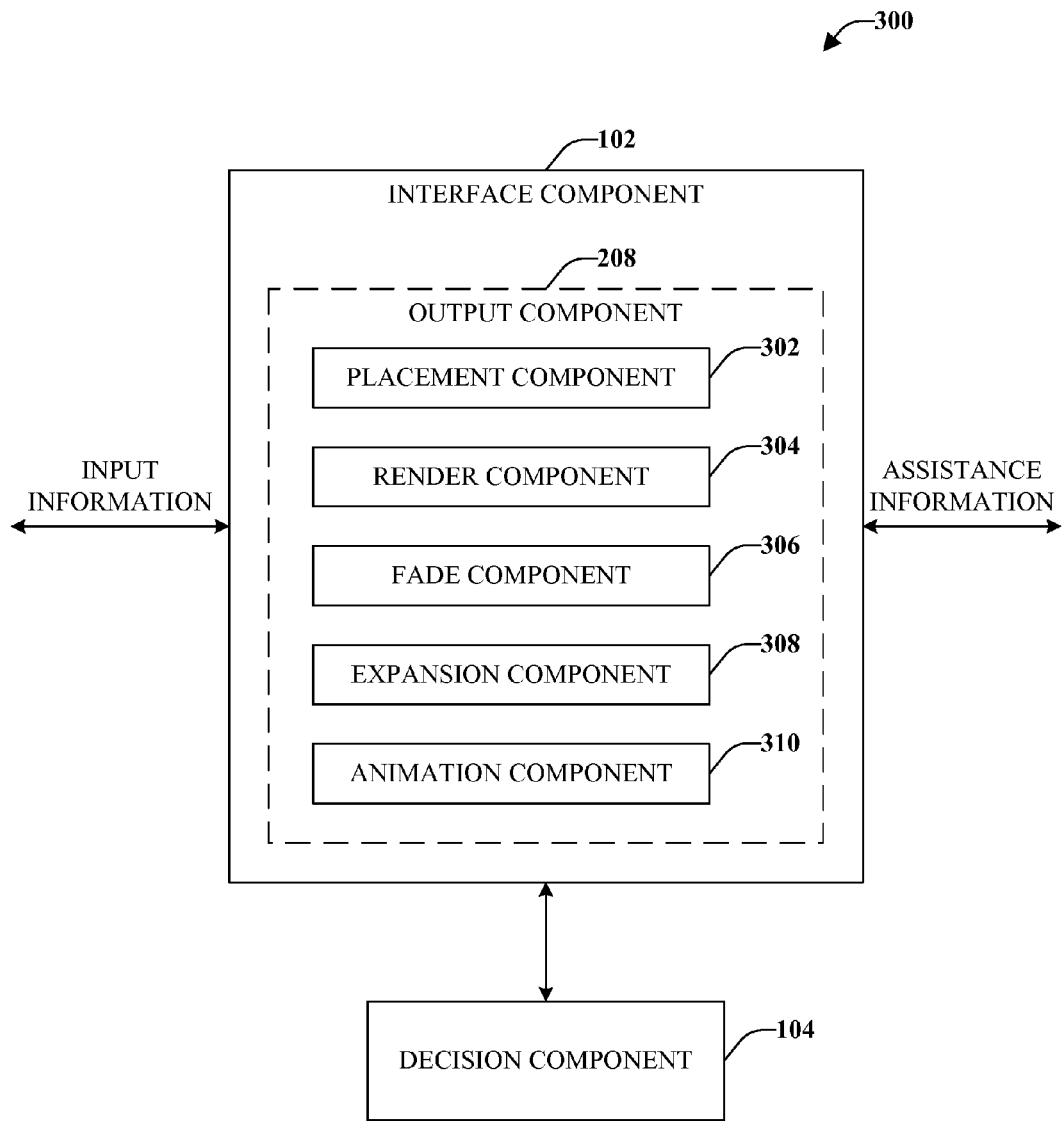
FIG. 3 illustrates a block diagram of an exemplary system that facilitates providing in situ assistance information with a detailed output component in accordance with an aspect of the subject disclosure.

FIG. 3 illustrates a system 300 that facilitates revealing tip or assistance information associated with a user interface in situ with controls of the user interface. The system 300 can include the interface component 102 that obtains input information and outputs in situ assistance information based at least in part on the obtained input information. In addition, the system 300 can include a decision component 104 that determines in situ assistance information output by the interface component 102.

The interface component 102 can include an output component 208 generates a GUI for an operating system and/or an application. In an embodiment, the GUI can include UI controls or interface elements as well tips that convey assistance information. The output component 208 includes a placement component 302 that ascertains placement of a UI control and/or an associated tip(s) relative to other elements of the GUI. The placement component 302 facilitates organizing UI controls and/or tip(s) on an output device such that occlusion of underlying interface elements is reduced or prevented. For example, it can be undesirable to have a tip masking an unrelated portion of the user interface and/or other tips. In an embodiment, the output component 208 can also include a render component 304. The render component 304 draws or generates a graphical image and/or portion of image to be displayed on an output device (not shown). The render component 304 can produce two-dimensional or three-dimensional representations of the UI controls 204 and tips for disclosure on the output device. The render component 304 can produce a final screen image in accordance with the placement information provided by the placement component 302. Render component 304 may employ window transparency, per-pixel alpha transparency, screen door transparency, color-key transparency, and/or nonrectangular window regions that conform to the outline of the tips so as to present a convincing illusion of an overlay tip window that appears in situ with other application content. In other embodiments, tips may be drawn directly in-situ by the host application such that overlay windows are not needed.

In addition, the output component 208 can include a fade component 306 that can provide fading aspects to a UI control, tip, or other portion of the interface. A fade can be a transition from an opaque state to a non-visible state that traverses varying degrees of translucency and vice-versa. For example, the fade component 306 can enable an interface element to fade into visibility, fade out of visibility, explode and fade out (e.g. a rapid progression to opacity followed by a fade out), or a combination thereof (e.g., fade out subsequent to a fade in). Furthermore, fading may be spatially correlated with the position of the input device or screen cursor, such that tips fade out in proportion to the distance of the pointer from an interface control. Moreover, the output component 208 can include an expansion component 308 that facilitates expanding and contracting a UI control, tip, tip collection or other portion of the interface out of and into a particular interface element. For example, the expansion component 308 enables a user to dismiss a collection of tips such that the displayed tip collection progressively contracts or shrinks into another UI control or portion of the interface that can be utilized to show the tip collection at a later time. Upon reactivation or showing, the tip collection can progressively expand or grow out of the interface element employed to activate the tips.

Moreover, the output component 208 can include an animation component 308. The animation component 308 can provide video or animations to various controls or components within a GUI. In an illustrative instance of a gesture-based interface, the animation component 308 can provide animations to a tip overlay that demonstrate a gesture motion or gesture sequence required to activate the feature associated with the tip overlay. The animation component 308 can facilitate user understanding of a gesture that can involve a complex motion or sequence by exhibiting the motion and/or sequence via animation.

Figure 4:
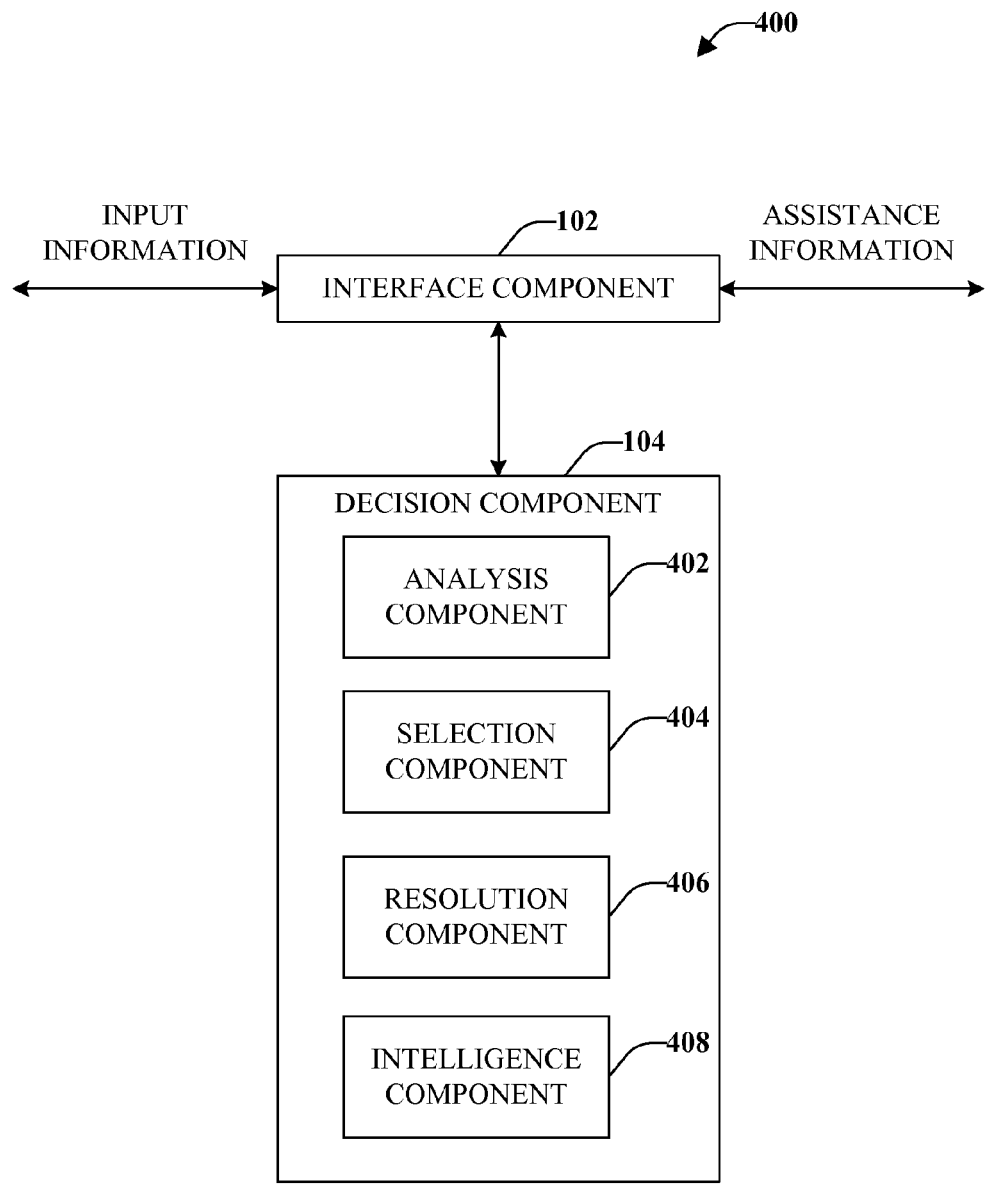
FIG. 4 illustrates a block diagram of an exemplary system that facilitates providing in situ assistance information with a detailed decision component in accordance with an aspect of the subject disclosure.

Referring to FIG. 4, illustrated is a system 400 that facilitates deciding whether assistance information should be conveyed to a user. The system 400 includes an interface component 102 that provides a GUI. The GUI provided by the interface component 102 collects input information from user via an input device (not shown). In addition, the interface component 102 provides assistance information related to employing features of the GUI. The assistance information can be conveyed as tips overlaid in situ with interactive elements or controls of the GUI. The system 400 can also include a decision component 104 that determines the assistance information conveyed to the user via the interface component 102 based at least in part on consideration of the input information or context information obtained from the interface component 102. In addition, the decision component 104 can also ascertain if the user requires assistance information by either inference or direct request from the user. For example, the system may decide to present tips if the user taps on an interface control that responds to stroke-based gestures, since this indicates that the user may not be aware of the gesture functionality.

The decision component 104 can include an analysis component 402 that evaluates input information and context information to produce relevant results. Context information can include such information as a state of underlying interface elements (e.g., user interface controls), screen dialogs currently in use, a current mode of the interface, a state of the user, user preference persisted in a data store (e.g., the system registry, or settings saved with an individual document) and/or any other information suitable for determining whether to reveal tips. In addition, input information can include data provided by a user, user interactions with the interface, and the like. Pursuant to an illustration, the analysis component 402 can obtain context information indicating a user is employing a digital notebook application with a pen-based input device. In addition, the analysis component 402 can evaluate input information obtained by the interface component 102 reflecting that the user is focusing on an icon, tool button or graphical portion such as a pen tool button employable to select various ink styles for pen-based input. The input information can indicate that the user is hovering over the pen tool button for a period without further interaction. Accordingly, the analysis component 104 can evaluate that the user is unsure of the appropriate gesture required to select a particular ink style.

In addition, the decision component 104 includes a selection component 404 that ascertains whether assistance information such as a tip overlay is to be conveyed to the user. The selection component 404 bases the determination at least in part on the evaluation provided by the analysis component 402. Moreover, the selection component 404 chooses the type of assistance information. For example, the selection component 404 can choose a tip collection associated with a search panel wherein the tip collection includes a plurality of tips showing the interactions required by a user to initiate various functional aspects of the search panel. In an embodiment, the decision component 104 can include a resolution component 406 that can be utilized by the analysis component 402 and the selection component 404 to resolve conflicts in the input information, context information or both. For example, a preference can be retained by a data store that indicates a user does not wish to see any assistance information associated with a search panel. A user can decide to hide search panel tips after the user gains sufficient familiarity with the gestures. However, the interface component 102 can obtain input information signifying that the user is hovering over an element of the search panel. The resolution component 406 can settle the apparent conflict by suggesting a subset of the tip collection associated with the search panel and, in particular, the subset can include tips relevant to the portion of the search panel occupying the user's focus.

Various inferences or determinations that occur in relation to the decision component 104 can be processed by an intelligence component 408. For instance, the intelligence component 408 can infer that a user requires a refresh of available interface gestures as the user has not interacted with a particular aspect for a period of time. Moreover, the artificial intelligence component 408 can make different determinations, such as determining an appropriate tip collection to display.

The intelligence component 408 can employ one of numerous methodologies for learning from data and then drawing inferences and/or making determinations related to applying a service (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Figure 5:
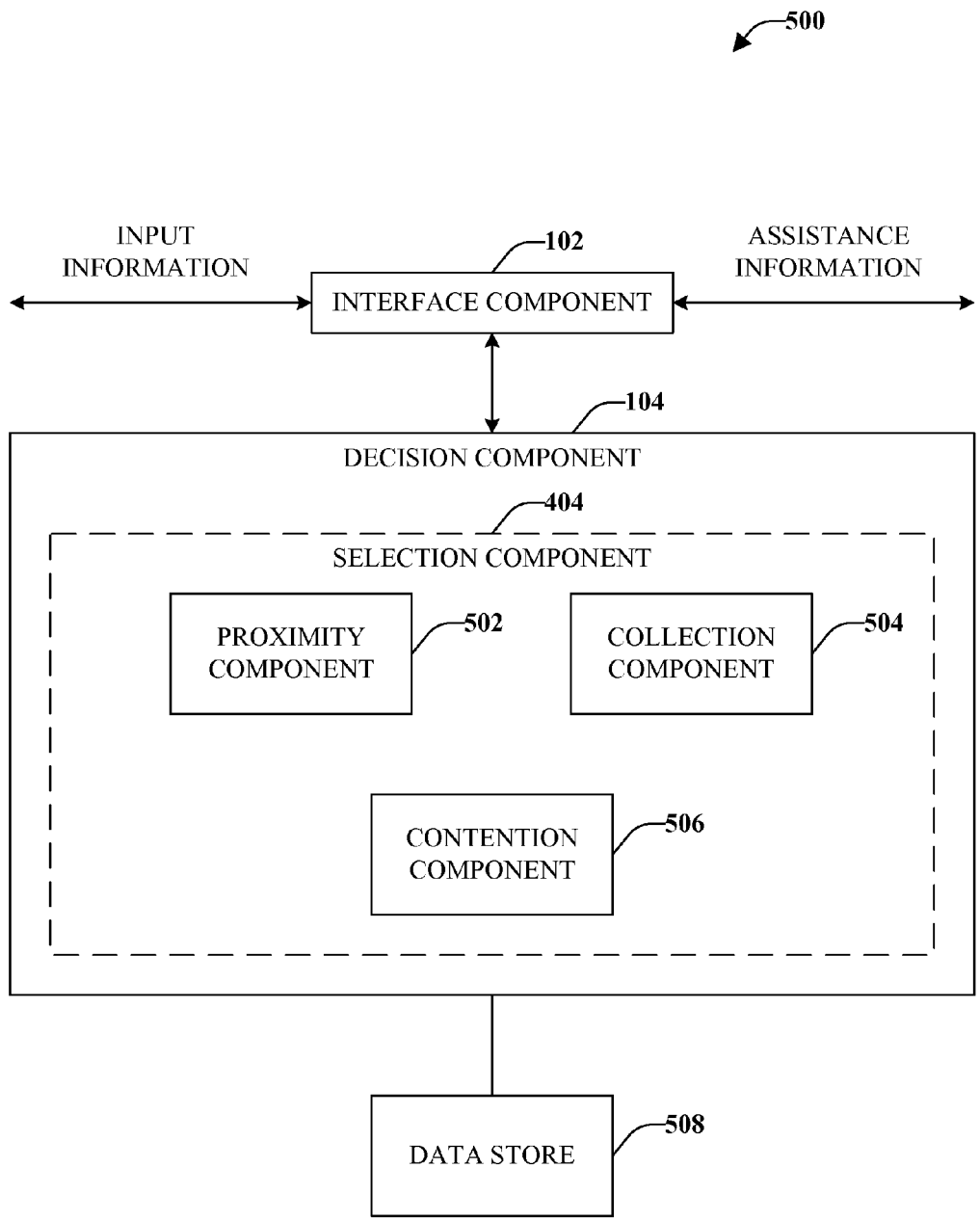
FIG. 5 illustrates a block diagram of an exemplary system that facilitates providing in situ assistance information with a detailed selection component in accordance with an aspect of the subject disclosure.

Turning to FIG. 5, an example system 500 is depicted that facilitates selection and display of assistance information associated with a GUI with an expanded decision component 104 and selection component 404. The system 500 can include the interface component 102 that obtains input information and outputs in situ assistance information based at least in part on the obtained input information. In addition, the decision component 104 can determine the in situ assistance information output by the interface component 102. The decision component 104 can include the selection component 404 that ascertains whether assistance information such as a tip overlay is to be conveyed to the user.

The selection component 404 can include a proximity component 502 that determines whether hover-based assistance information should be displayed. Pursuant to an illustration, the proximity component 502 can be utilized to decide displaying assistance information in gesture based interfaces. For example, marking menus are an established pen-input technique in gesture based interfaces. Marking menus offer menu commands not in list form as conventional menus do, but rather the menu commands are placed in different directions (e.g., cardinal compass directions) around a central interface element or control. A gesture, such as stroking or flicking, towards the desired command selects it. With marking menus, a user must remember which direction to gesture in order to activate a corresponding command. Once the layout becomes familiar, marking menus provide fast interactions, particularly with pen input. However, in early learning stages or after long periods of disuse, the user can require reminding of the commands.

In an embodiment, a transient semi-transparent overlay can be provided as an effective hover tip over UI controls such as marking menus. It is to be appreciated that translucent overlay hover tips can be employed with other UI controls in addition to marking menus. For example, hover tips can be utilized in connection with buttons, menus, embeddable icons (e.g., links to files, web pages, persistent representations of saved queries, etc.), contextual menus that act on zero or more objects in a current selection, and the like. According to an embodiment, the hover tip overlay is a translucent surround about the central element of a marking menu wherein the tip information that indicates the commands associated with a given gesture direction is displayed on top of the surround.

The proximity component 502 can ascertain when the hover tip overlay and surround should appear based upon the user hovering an input device over the control associated with the tip. The translucent surround feature serves several purposes. For example, the surround separates the foreground menu layer from the background UI and/or content layers. It is to be appreciated that the surround may be omitted, but this can cause greater interference between the layers and/or decrease the utility of the tip information by reducing the ease at which it can be perceived. In addition, the translucency of the surround indicates that the tip information is transient and not directly actionable or interactive. Moreover, the translucent surround hover tip maintains the context of the original menu (prior to tip revelation) so the user remains oriented. In addition, the surround clearly indicates to the user where the tip came from and maintains visibility of other nearby options if the user wishes to motion the input device to hover over those options (i.e., nearby marking menu controls can be perceived through the translucent surround). This makes it possible for the user to serially inquire each of a series of marking menus by hovering the input device over each one in turn. In an embodiment, labels of the tip representing the commands of the marking menu can be rendered opaque while only the surround remains translucent so as to increase contrast between the gesture commands the background layer.

In another example, the hover tip integrates additional contextual information, such as, but not limited to, file names, web page titles, thumbnails, universal resource locators for embedded documents and/or web pages or the like. Further, in an illustrative instance of a pen-based input with a digital notebook application, the contextual information can include recognized handwriting corresponding to ink associated with a UI control. The added context information can be positioned relative to the hover tip to avoid overlap with any of the available gestural commands. In addition, depending on the closeness of a viewable area edge, the location of the contextual information can be moved to a different position that will remain visible.

Pursuant to the marking menu illustration, the interface component 102 and proximity component 502 perform several elements of hover-based tip activation that can improve usefulness of the tips and, accordingly, the user's ability to perceive and learn the assistance information conveyed therein. For example, the interface component 102 can transform a cursor or other mechanism operable to signify a position on a display. The interface component 102 transforms a state, shape or graphical form of the cursor as it moves over a UI control associated with a marking menu to indicate that a gesture commands are available relative to the UI control. It is to be appreciated that other transformations are possible. For example, the cursor can transform to signify the availability of dragging gestures. Moreover, the proximity component 502 can determine, based upon the input information, whether a duration of hover perceived is sufficient to trigger revelation of a hover-based tip. For example, the hover tip can appear after the input device hovers above the marking menu for a time-out period to prevent hover tips from spuriously appearing as the user motions around the interface. In an embodiment, the time-out period can be 500 to 1000 milliseconds in duration. In addition, the time-out period can shorten after a first hover tip activates to enable a user to quickly browse hover tips for a group of marking menus. Moreover, it is to be appreciated that other input information beyond hover time can be consider in deciding whether to reveal hover tips. For example, hover tips can be activated regardless of hover time if the user motions the input device at a velocity under a threshold. In such a case, it can be inferred that the user is slowly roaming the interface in search of a particular feature.

The proximity component 502 can also determine whether to dismiss a revealed hover tip. In an embodiment, the hover tip can be dismissed once the user hovers off the central UI control associated with the hover tip surround. In addition, for pen-based input devices, the proximity component 502 can hold the hover tip on the display for a few seconds, or indefinitely if desired, despite registering an out-of-range event indicating the user has pulled the pen away from the tablet or touch screen. For pen-based gesture input on a display tablet, the pen and the user's hand occludes a portion of the screen. A user can withdraw from the screen in order to observe the hover tip without obstruction and the proximity component 502 does not immediately dismiss the hover tip. On devices without an out-of-range and/or hover capability (e.g. touch-sensitive Ultra Mobile Personal Computers (UMPC's), or if out-of-range events cannot be reported to user applications by the device driver or operating system, the system may observe when the cursor remains completely motionless and use this to infer that a pointing device has been withdrawn from the screen surface.

It is to be appreciated that the proximity component 502 can provide hover tip determinations to other UI controls beyond marking menus. For example, hover tips can be employed in conjunction with tab controls representing pages of a document. When a user hovers over the tab controls and a lingers for a time-out period, a hover tip explaining gestures associated with the tab controls can be revealed. For instance, the hover tip can convey a gesture that demonstrates that pages can be rearranged by dragging the tab controls via an input device. In another embodiment, a thumbnail image of a page contents can be shown when a user hovers of a corresponding page tab.

According to another embodiment, selection component 404 can employ a collection component 504 to determine if a tip collection should be revealed. In situations, assistance information or tips do not exist in isolation but can form a tip collection providing assistance information illustrating principal interactive behavior of a functional element or area of the user interface. For example, a tip collection can convey assistance information in the form of in situ tips for an entire dialog box of the user interface. Tip collections enable a user to view a variety of gestures available in a functional area of the user interface, discover UI elements that can be used together, and/or extrapolate how one or more gestures can be combined and/or selected to achieve a desired goal. While tips are visible, the underlying UI remains active and capable of interaction. Accordingly, a user can perceive assistance information while continuing to work.

The collection component 504 analyzes the input information obtained by the interface component 102 to evaluate whether to display a tip and/or a collection of tips in situ with the user interface provided by interface component 102. In addition, the collection component 504 takes into account context information such as a state of underlying interface elements (e.g., user interface controls), screen dialogs currently in use, a current mode of the interface, a state of the user and/or any other information suitable for a determination of whether to reveal tips. The collection component 504 can ascertain whether to dismiss some or all of the tips currently revealed.

In an embodiment, the collection component 504 can hide or reveal tips based on an explicit request from a user. For example, mechanisms can be provided to a user to hide tips or a subset of tips and/or show tips or a subset of tips. A hide tips UI control can be provided in association with a tip collection displayed. The user can interact with the hide tips UI control to dismiss the tip collection currently visible. It is to be appreciated that more than one hide tips UI control can be employed. For example, a plurality of controls can be associated with different portions or subsets of visible tips. Further, each individual tip can be associated with a control by which to dismiss the tip. Moreover, a UI control can be provided to explicitly recall or show tips. Once the control is activated, the collection component 504 can determine what tips are to be shown. In addition, separate elements of the user interface can include an exclusive show tips control for enabling tips on the separate element alone. The interface component 102 can employ animations when hiding and showing tips in accordance with determinations made by the decision component 104. For example, a tip collection can be animated to emerge and expand from a particular UI control a user can employ to explicitly activate the tip collection. In addition, the tip collection can be animated to shrink or contract into the UI control upon dismissal to inform a user of the control necessary to reactive the tips.

The collection component 504 and decision component 104 can communicate with a data store 508 to persist user preferences with regard to tips and/or tip collections. A control can be provided along with a tip collection to enable a user to choose to suppress the tip collection once a user gains familiarity with the underlying UI functionality. A user can employ the control to indicate that the tip collection should not appear again even in situations in which the decision component 104 would determine revelation is appropriate. The preference can be persisted in data store 508. The collection component 504 queries data store 508 to discover if a preference is retained and suppresses a tip collection accordingly. The preference can be persisted across application instances, persisted across the operating system, associated with a particular user or a particular file, etc.

It is to be appreciated that the data store 508 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 508 of the subject systems and methods is intended to comprise, without being limited to, these and any other suitable types of memory. In addition, it is to be appreciated that the data store 508 can be a server, a database, a hard drive, a pen drive, an external hard drive, a portable hard drive, and the like.

In an embodiment, the proximity component 502 and/or the collection component 504 can determine to reveal a tip and/or tip collection. Numerous gesture commands can be available to a user relative to a single region of the user interface. In some situations, gestures commands can be defined to avoid spatial overlap. However, even in such situations, numerous tips can overlap each other. The decision component 104 can include a contention component 506 to resolve multiple overlapping gestures on a given area of the interface. In an illustrative instance, when a user selects a lasso selection tool in a digital notebook application, tips can be revealed in situ that demonstrate various functional aspects of the lasso selection tool, including gestures employable via an input device to active respective functional aspects. The revealed tips can be a collection of commonly utilized aspects, for example. The tips can be hierarchically organized to signify dependencies. For example, a gesture employable to drag a selection is dependent upon a selection being made. Thus, the drag gesture tip can be shown dependent upon a gesture employable to select an object, portion of content, etc. In addition, the subset of tips displayed can be only those with preconditions satisfied. The revealed tips can be static representations of the respective gestures, or they may contain images of or be drawn in reference to the current content and objects in a user's document. In addition, the revealed tips can be videos and/or animations of the gestures being drawn.

FIGS. 6-10 illustrate methodologies and/or flow diagrams in accordance with the claimed subject matter. For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 6:
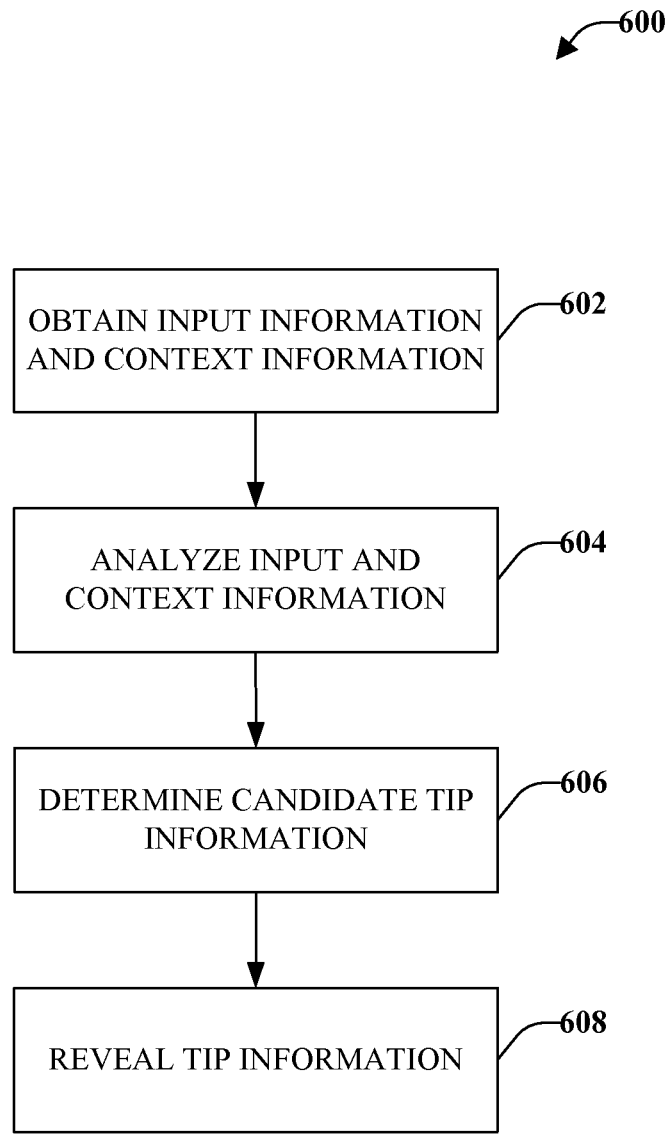
FIG. 6 illustrates an exemplary methodology for revealing tip information in situ with a user interface.

FIG. 6 illustrates a method 600 that facilitates providing assistance information in situ with a user interface. The method 600 commences at reference numeral 602 where input information and/or context information is obtained. The input information can include information regarding interactions of a user with the user interface. The context information can include a state of underlying interface elements (e.g., user interface controls), screen dialogs currently in use, a current mode of the interface, a state of the user and/or any other information suitable for a determination of whether to reveal tips. At reference numeral 604, the input information and/or context information is analyzed to evaluate or infer a state of the user with respect to the user interface. For example, it can ascertained based upon the input information and/or context information that the user is unsure what interactions are required to bring about particular functionality of an application. At reference numeral 606, candidate tip information is selected. The candidate tip information can be determined based at least in part on the analysis of the input and/or context information. For example, the input information can indicate that a user is hovering over a marking menu UI control. The candidate tip information can include a hover tip conveying available gesture commands associated with the UI control. At reference numeral 608, the candidate tip information is revealed in situ with the interface. Pursuant to an example, the tip information can be revealed as an overlay to the associated UI control.

Figure 7:
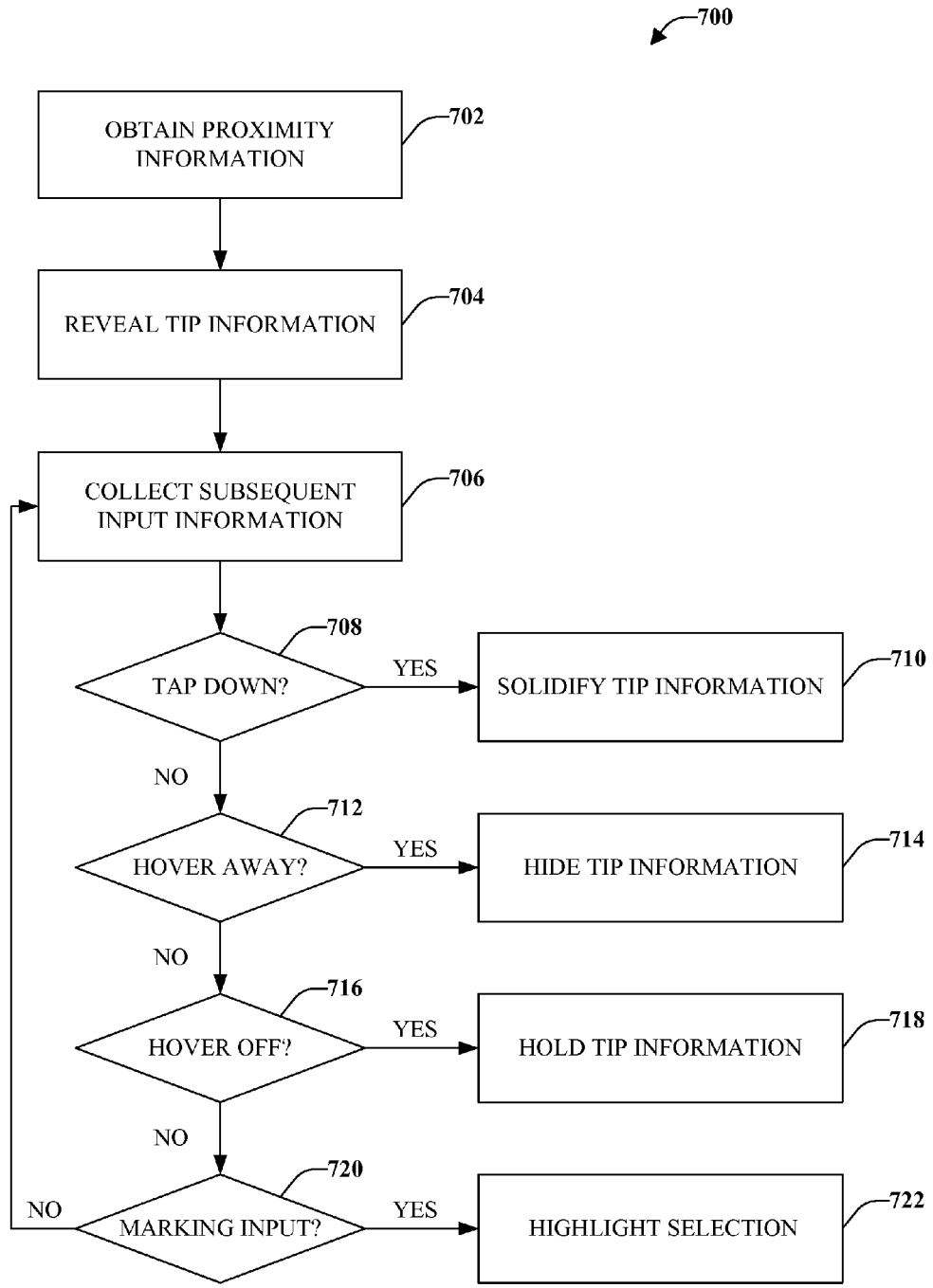
FIG. 7 illustrates an exemplary methodology for revealing tip information in situ with gesture-based marking menu in a user interface.

FIG. 7 illustrates an example method 700 that facilitates employing in situ assistance information in connection with gesture-based interfaces. The method 700 can be employed with a user interface to aid users with learning and/or remembering functional aspects of the interface. For example, the method 700 can be utilized to provide in situ interface tips associated with marking menus. Marking menus are an established pen-input technique in gesture-based interfaces. Marking menus offer menu commands not in list form as conventional menus do, but rather the menu commands are placed in different directions (e.g., cardinal compass directions) around a central interface element or control. A gesture, such as stroking or flicking, towards the desired command selects it.

The method 700 commences at reference numeral 702 where proximity information is collected. Proximity information can include, for example, indications that a user is maintaining proximity to a marking menu central control via an input device. For example, with pen-based gesture interfaces, the user can hover the pen over the marking menu control. At reference numeral 704, tip information is revealed in response to the proximity information. In an illustrative instance, the tip information can include a translucent in situ overlay providing an explanation of the gesture commands employable with the marking menu control. At reference numeral 706, additional input information is obtained. At reference numeral 708, a determination is made as to whether the input information obtained indicates a tap down. A tap down event may register if a user touches the central control of marking menu with an input device for a given period of time (e.g., a third of a second). If the input information is a tap down event, the method proceeds with reference numeral 710 where the tip information can solidify from translucent to opaque.

If No, the method proceeds to reference numeral 712 where a determination is made as to whether the input information indicates a hover away event. For example, a user can hover outside the central control element of a marking menu to achieve a hover away event. If Yes, the tip information is hidden at reference numeral 714. In an embodiment, the tip hide on hover away discourages the user from selecting the displayed commands with the input device rather than perform the associated gesture. In another embodiment, the user may hover to the desired function and then tap on the hover overlay itself as an alternative to employing the actual gesture to activate the command. If No, the method proceeds to reference numeral 716.

At reference numeral 716, a determination is made as to whether the input information signifies a hover off. In an illustrative instance of pen-based input, a user's hand occludes a portion of the screen. Thus, the user can remove the pen from the screen in order to view the displayed tip information. This can trigger a hover off event. If the input information indicates a hover off event, the method proceeds to reference numeral 718 where the revealed tip information holds on the display to enable a user to perceive it. If the input is not a hover off event, the method proceeds to reference numeral 720. At 720, it is ascertained if the input information indicates marking input or a gesture. If Yes, the method proceeds to reference numeral 722 where the command on the tip information selected by the marking input is highlighted. For example, the selected command can explode and fade. In another embodiment, the command can just appear with a subsequent fade. In addition, the command can appear and then vanish after a specified time (e.g., 1 second). If the input information is not marking input, the method proceeds back to reference numeral 706 where additional input information is collected.

Figure 8:
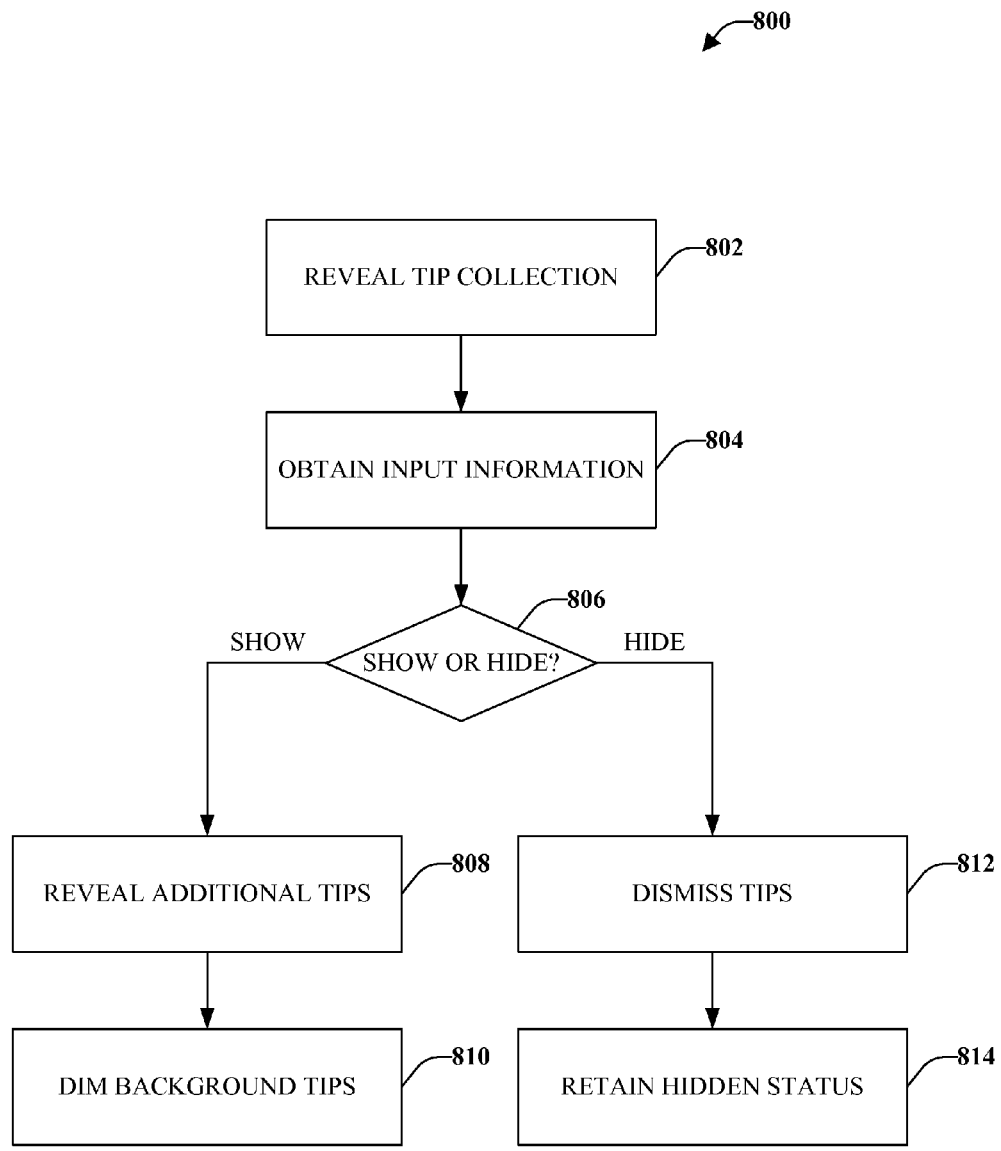
FIG. 8 illustrates an exemplary methodology for managing tip collections in accordance with an aspect of the subject disclosure.

FIG. 8 illustrates a method 800 that facilitates managing tip collections in situ with a user interface. In situations, assistance information or tips do not exist in isolation but can form a tip collection providing assistance information illustrating principal interactive behavior of a functional element or area of the user interface. For example, a tip collection can convey assistance information in the form of in situ tips for an entire dialog box of the user interface. Tip collections enable a user to view a variety of gestures available in a functional area of the user interface, discover UI elements that can be used together, and/or extrapolate how one or more gestures can be combined and/or selected to achieve a desired goal. At reference numeral 802, a tip collection is revealed. At reference numeral 804, input information is collected. At 806, a determination is made as to whether the input information relates to showing or hiding tips. For example, a user can hover over a control associated with hover tips. The hover action can trigger additional tips. In addition, a user can explicitly show or hide tips and/or tip collections. If the input information indicates show, the method proceeds to reference numeral 808 where additional tips are revealed in accordance the input information. At 810, background tips previously revealed are dimmed (or removed completely) so as to not interfere with user perception of the additional tips. If hide was signified from the input information, the revealed tip collection is dismissed at reference numeral 812. At 814, the hidden status is retained such the tip collection does not reveal again unless explicitly requested by a user.

Figure 9:
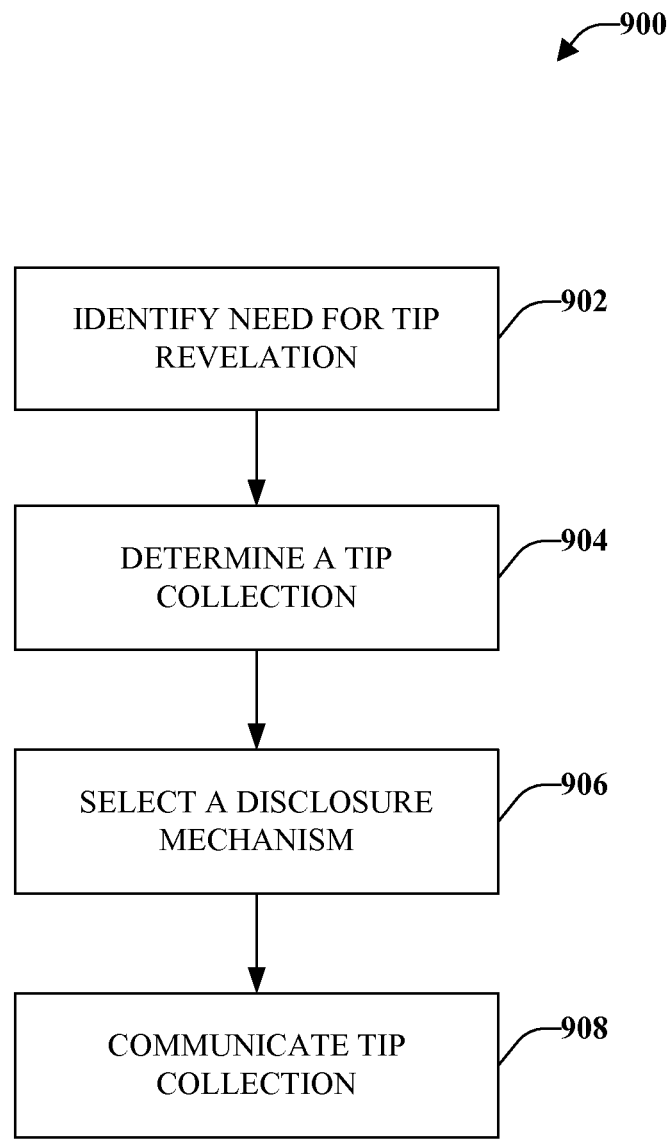
FIG. 9 illustrates an exemplary methodology that facilitates revealing tip information for multiple overlapping gestures according to an aspect of the subject disclosure.

Turning now to FIG. 9, a method 900 is illustrated that facilitates providing assistance information for multiple overlapping gesture inputs in a gesture-based user interface. A variety of gestures can be employable from a given area of the user interface. The gestures can spatially overlap such that it becomes difficult to display in situ tip information. The method 900 commences at reference numeral 902 where a need to reveal tip information is identified. For example, a user may hover over a portion of the user interface actionable with gestures. In addition, a need can be identified when a user activates an aspect of an application for the first time. At reference numeral 904, a tip collection is identified. For example, in the case of a single hover control, the tip collection can include a hover overlay for that control. In addition, a plurality of tip can be selected when a dialog is activated in the user interface. Moreover, a tip collection including exemplary or common gestures can be selected. At reference numeral 906, a disclosure mechanism is selected. For example, a series of frames including static representations of multiple overlapping gestures can be employed. In addition, the tips can be videos or animations of the gestures being drawn. At reference numeral 908, the selected tip collection is communicated in accordance the determined disclosure mechanism.

Figure 10:
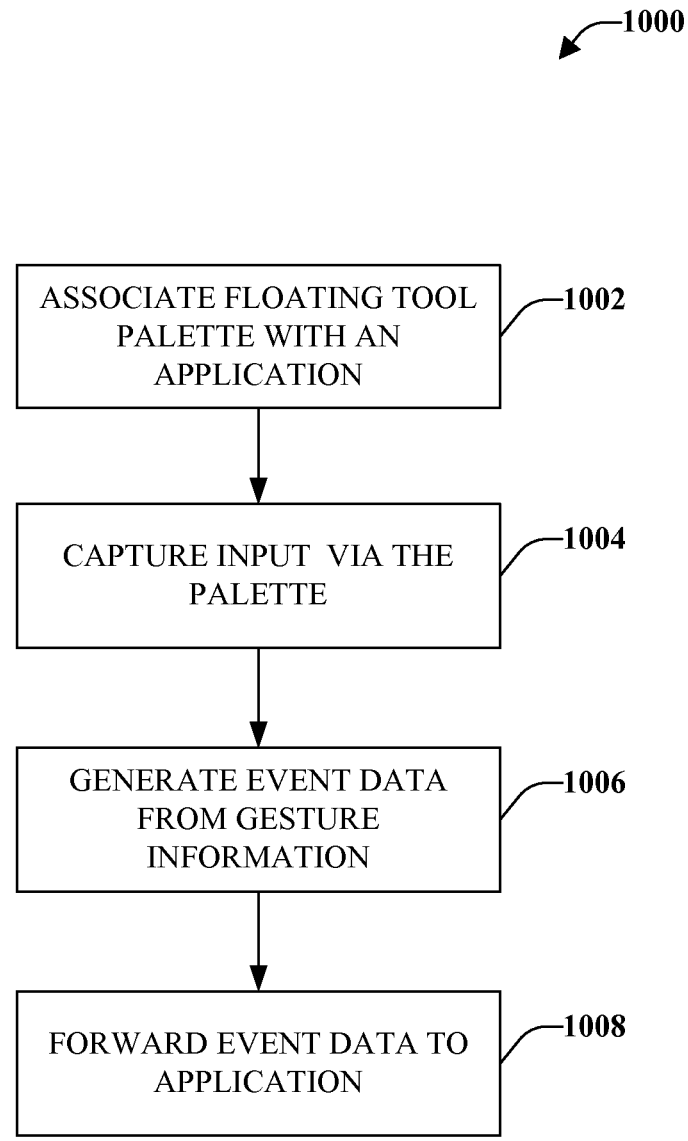
FIG. 10 illustrates an exemplary methodology that facilitates extending gestures to applications in accordance with an aspect of the subject disclosure.

FIG. 10 illustrates an example method 1000 that facilitates extending gesture input to preexisting applications. For example, some applications, such as a digital notebook application, fully employ gestures. However, some applications do not employ any gestures by default. At reference numeral 1002, a floating tool palette is associated with an application. In an illustrative instance, the floating tool palette can be a translucent overlay placed in a conspicuous location on the associated application or window. In addition, the floating tool palette can solidify (e.g., becomes opaque) as a user hovers over the palette. At reference numeral 1004, input entered via the palette is captured. For example, a user can activate the palette control and initiate a gesture. In the case of pen-based input, a user can touch the pen down on to the palette to initiate a gesture. As long as the gesture initiates within the tool palette, the gesture motion can escape the bounds of the tool palette and the input is still captured. At reference numeral 1006, event data is generated from the gesture information. For example, if a gesture is a scrolling gesture, scrolling event data is generated. At reference numeral 1008, the generated event data is forwarded to the associated application. Thus, the gesture motion performs an input operation on a user interface not originally implemented with gesture-based commands. This shows how an overlay can be used not only to reveal gesture functionality, but also to directly support gesture functionality on top of applications that normally would not implement such gestures. It also shows how gestural tips may themselves offer interactive feedback in response to user movement of a pointing device, rather than providing just information displays.

Figure 11:
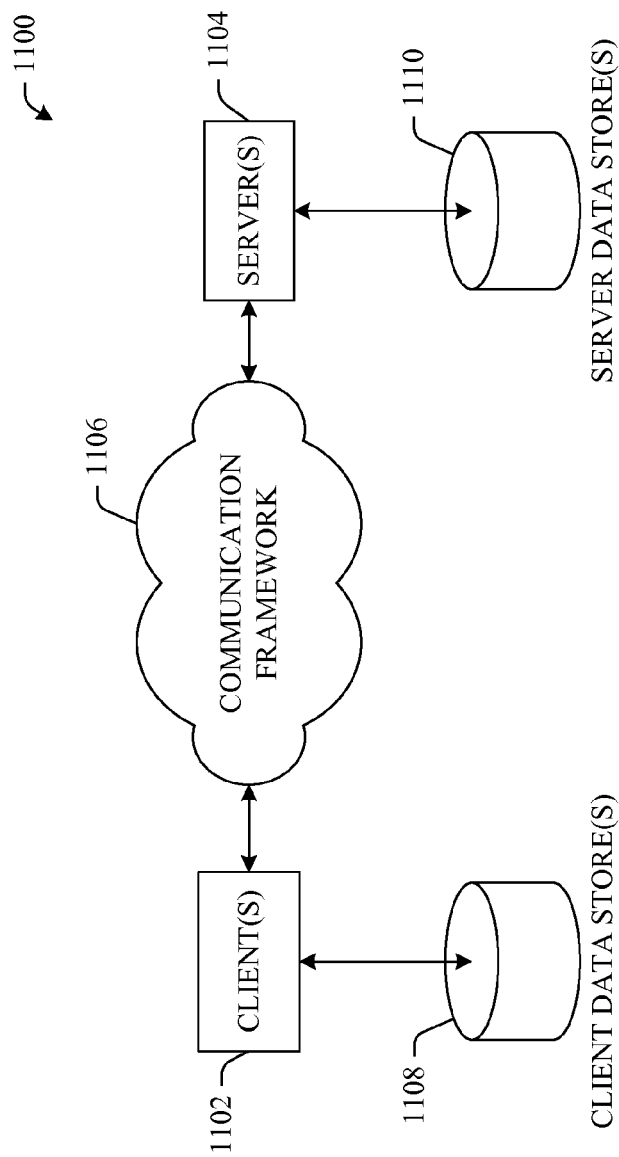
FIG. 11 illustrates an exemplary networking environment, wherein the novel aspects of the claimed subject matter can be employed.
Figure 12:
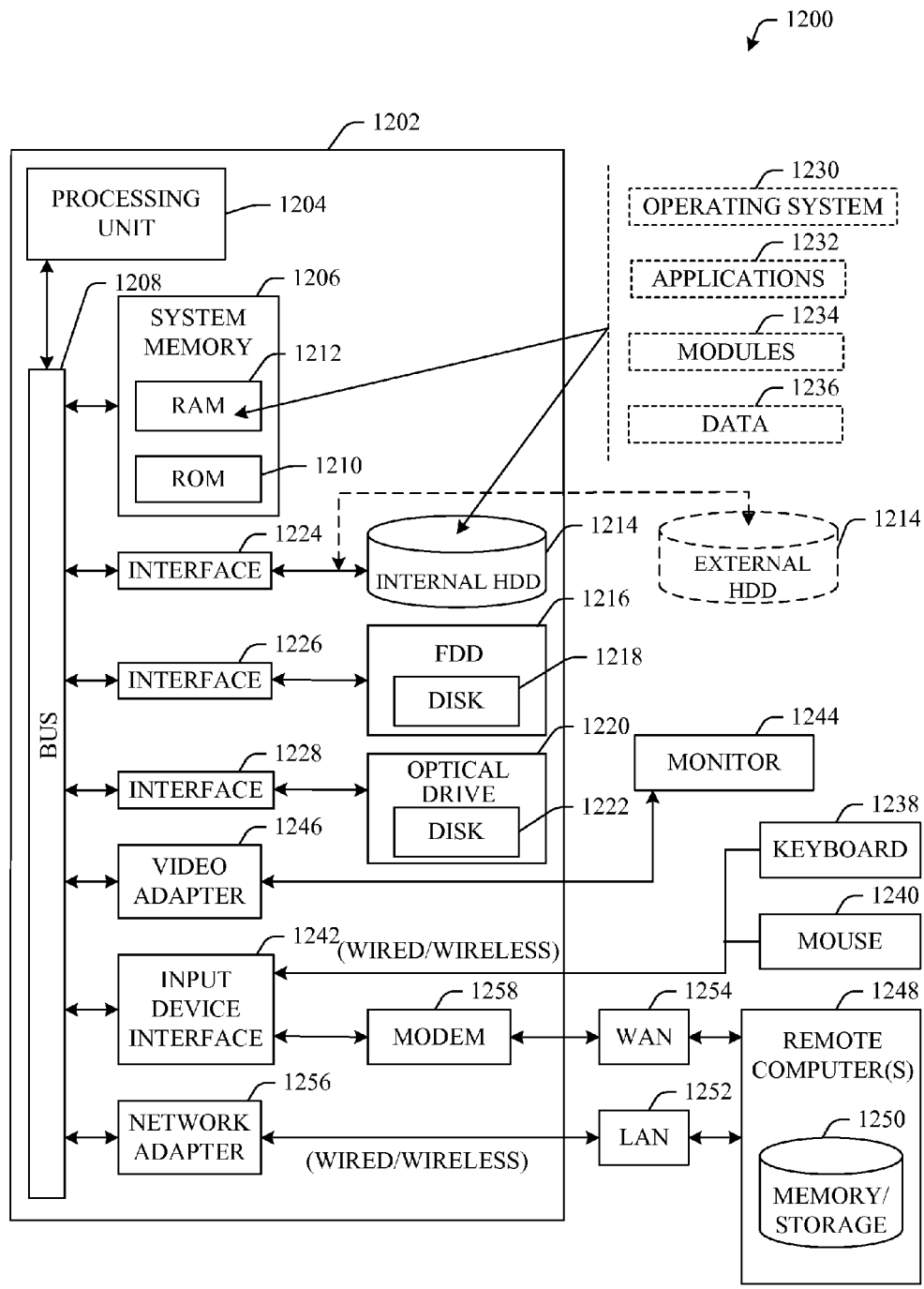
FIG. 12 illustrates an exemplary operating environment that can be employed in accordance with the claimed subject matter.

In order to provide a context for the various aspects of the disclosed subject matter, FIGS. 11 and 12 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 11, there is illustrated a schematic block diagram of a computing environment 1100 in accordance with the subject specification. The system 1100 includes one or more client(s) 1102. The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware and/or software (e.g., threads, processes, computing devices). The servers 1104 can house threads to perform transformations by employing the specification, for example. One possible communication between a client 1102 and a server 1104 can be in the form of a data packet adapted to be transmitted between two or more computer processes. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

Referring now to FIG. 12, there is illustrated a block diagram of a computer operable to execute the disclosed architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method for providing gesture-based input to an application user interface, comprising:
   associating a floating tool palette with the application user interface, the floating tool palette including at least one gestural tip that presents gesture functionality associated with the application user interface based at least in part on a period of time between a current interaction of a user with a particular element of the application user interface and a previous interaction of the user with the particular element, wherein the at least one gestural tip illustrates movement of a particular gesture sequence, and wherein the at least one gestural tip comprises a video or an animation of the particular gesture sequence;
   capturing at least one gesture input in response to presentation of the at least one gestural tip, wherein the at least one gesture input is associated with the at least one gestural tip included in the floating tool palette; and
   based at least in part on the captured at least one gesture input, forwarding event data to an application associated with the application user interface.

2. The method of claim 1, further comprising generating the event data based at least in part on the captured at least one gesture input.

3. The method of claim 1, wherein the floating tool palette comprises a translucent overlay placed on the application user interface.

4. The method of claim 3, further comprising displaying the floating tool palette as opaque when a user input hovers over the floating tool palette.

5. The method of claim 1, further comprising providing the floating tool palette based at least in part on a user preference persisted in a data store.

6. The method of claim 1, wherein the at least one gestural tip presents gesture functionality based at least partly on at least one detected non-gesture input to the floating tool palette.

7. The method of claim 1, further comprising providing the floating tool palette with a subset of the gestural tips the floating tool palette is configured to display.

8. The method of claim 1, wherein at least one of:
   the at least one gesture input comprises at least one of a gesture start point, a gesture end point, a path of a gesture movement, or a speed of motion of a gesture movement; or
   the at least one gesture input includes a scrolling gesture, and wherein the event data includes scrolling event data.

9. One or more computer-readable storage media storing instructions that, when executed by at least one processor, instruct the at least one processor to perform actions comprising:
   providing a tool palette for a user interface of an application, the tool palette including gestural tips that are provided based at least partly on a period of time between a current interaction of a user with a particular element of the application user interface and a previous interaction of the user with the particular element, wherein each of the gestural tips illustrates movement of a respective gesture sequence, and wherein each of the gestural tips comprises a video or an animation of the respective gesture sequence;
   capturing at least one gesture associated with the gestural tips in response to presentation of at least one of the gestural tips, wherein the at least one gesture is input at least partly to the tool palette; and
   forwarding event data to the application, the event data generated based at least partly on the captured at least one gesture.

10. The one or more computer-readable storage media of claim 9, wherein the tool palette comprises a translucent overlay to the user interface.

11. The one or more computer-readable storage media of claim 10, wherein the actions further comprise solidifying the tool palette when an input hovers over the tool palette.

12. The one or more computer-readable storage media of claim 9, wherein the tool palette provides support for one or more gesture-based commands in the user interface of the application, wherein the application was not originally implemented to support gesture-based commands.

13. The one or more computer-readable storage media of claim 9, wherein the at least one gesture is initiated within the tool palette and is terminated outside the tool palette.

14. A system comprising:
   at least one processor;
   an intelligence component comprising instructions executed by the at least one processor to infer an unfamiliarity of a user with an element of a user interface for an application, the inferring based at least partly on a period of time between a current interaction of the user with the element and a previous interaction of the user with the element;
   a decision component comprising instructions executed by the at least one processor to provide a tool palette that includes gestural tips for the user interface, the gestural tips based at least partly on the inferring, wherein each of the gestural tips illustrates movement of a respective gesture sequence, and wherein each of the gesture tips comprises a video or an animation of the respective gesture sequence; and
   an interface component comprising instructions executed by the at least one processor to:
   capture at least one gesture associated with the gestural tips in response to presentation of at least one of the gestural tips, wherein the at least one gesture is input at least partly to the tool palette;
   generate event data based at least partly on the captured at least one gesture; and
   forward the generated event data to the application.

15. The system of claim 14, wherein the tool palette comprises a translucent overlay to the user interface.

16. The system of claim 15, wherein the interface component further operates to solidify the tool palette as a user input hovers over the tool palette.

17. The system of claim 14, wherein the tool palette provides support for one or more gesture-based commands in the user interface of the application, wherein the application was not originally implemented to support the one or more gesture-based commands.

18. The system of claim 14, wherein the at least one gesture is initiated within the tool palette and is terminated outside the tool palette.

19. The system of claim 14, wherein the at least one gesture includes a scrolling gesture, and wherein the event data includes scrolling event data.

\* \* \* \* \*